United States Patent
Zhong

(10) Patent No.: US 10,489,176 B2
(45) Date of Patent: *Nov. 26, 2019

(54) METHOD, SYSTEM AND APPARATUS FOR CREATING VIRTUAL MACHINE

(71) Applicant: Huawei Technologies Co., Ltd., Shenzhen (CN)

(72) Inventor: Yong Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 456 days.

This patent is subject to a terminal disclaimer.

(21) Appl. No.: 14/492,329

(22) Filed: Sep. 22, 2014

(65) Prior Publication Data

US 2015/0113529 A1 Apr. 23, 2015

Related U.S. Application Data

(63) Continuation of application No. PCT/CN2013/085820, filed on Oct. 23, 2013.

(51) Int. Cl.
*G06F 9/455* (2018.01)
*G06F 9/50* (2006.01)

(52) U.S. Cl.
CPC ...... *G06F 9/45558* (2013.01); *G06F 9/45545* (2013.01); *G06F 9/5033* (2013.01);
(Continued)

(58) Field of Classification Search
CPC ........... G06F 2009/4557; G06F 9/4077; G06F 9/502; G06F 9/5077; G06F 9/45558;
(Continued)

(56) References Cited

U.S. PATENT DOCUMENTS 6,643,672 B1 11/2003 Lebel
6,711,607 B1 * 3/2004 Goyal ............... G06F 9/5044
709/203
(Continued)

FOREIGN PATENT DOCUMENTS

CN 101267334 A 9/2008
CN 101650667 A 2/2010
(Continued)

OTHER PUBLICATIONS

Silva et al. ("CloudBench experiment automation for cloud environments", IEEE, Mar. 2013, pp. 302-311).*
(Continued)

*Primary Examiner* — Benjamin C Wu
(74) *Attorney, Agent, or Firm* — Kilpatrick Townsend & Stockton LLP

(57) ABSTRACT

A method, a system, and an apparatus for creating a virtual machine. The method includes receiving a virtual machine creation request to create a plurality of virtual machines; dividing the plurality of virtual machines into a plurality of virtual machine groups; determining a home physical rack for each virtual machine group, where one virtual machine group corresponds to one home physical rack; and creating each virtual machine group on the home physical rack of each virtual machine group. Because each virtual machine group is created on a home physical rack to which each virtual machine group belongs, each virtual machine group is equivalent to one physical rack.

18 Claims, 11 Drawing Sheets

(52) U.S. Cl.
CPC .. *G06F 9/5077* (2013.01); *G06F 2009/45562* (2013.01); *G06F 2209/505* (2013.01)

(58) Field of Classification Search
CPC .... G06F 9/45533; G06F 9/5044; G06F 9/505; G06F 9/45545; G06F 9/5033; G06F 2209/505; G06F 2009/45562; H04L 67/1097; H04L 41/0816; H04L 41/065
See application file for complete search history.

(56) References Cited

U.S. PATENT DOCUMENTS

| | | | |
|---|---|---|---|
| 8,671,176 | B1 | 3/2014 | Kharitonov et al. |
| 2009/0210527 | A1* | 8/2009 | Kawato ............... G06F 9/45558 709/224 |
| 2010/0303075 | A1 | 12/2010 | Tripathi et al. |
| 2011/0029969 | A1* | 2/2011 | Venkataraja .......... G06F 9/5077 718/1 |
| 2012/0102199 | A1* | 4/2012 | Hopmann ............. G06F 9/5044 709/226 |
| 2013/0031559 | A1* | 1/2013 | Alicherry .............. G06F 9/5066 718/104 |
| 2013/0042003 | A1* | 2/2013 | Franco ................ H04L 67/1097 709/226 |
| 2013/0227558 | A1* | 8/2013 | Du ...................... G06F 9/45558 718/1 |
| 2014/0059310 | A1* | 2/2014 | Du .......................... G06F 3/065 711/162 |
| 2015/0040129 | A1* | 2/2015 | Park .................... G06F 9/45558 718/1 |
| 2016/0014039 | A1* | 1/2016 | Reddy .................... H04L 67/38 709/224 |
| 2017/0060707 | A1* | 3/2017 | Harper ................ G06F 11/2033 |
| 2018/0173567 | A1* | 6/2018 | Olshefski ............. G06F 9/5011 |
| 2018/0255121 | A1* | 9/2018 | Hiltunen ................ G06F 9/445 |
| 2019/0028342 | A1* | 1/2019 | Kommula ............... H04L 41/06 |

FOREIGN PATENT DOCUMENTS

| | | |
|---|---|---|
| CN | 102426475 A | 4/2012 |
| CN | 103036949 A | 4/2013 |
| CN | 103067425 A | 4/2013 |

OTHER PUBLICATIONS

Mihailescu et al ("enhancing Application robustness in cloud data centers", ACM, 2011, pp. 133-147).*
Su et al., "Affinity and Conflict-Aware Placement of Virtual Machines in Heterogeneous Data Centers," 2015 IEEE Twelfth International Symposium on Autonomous Decentralized Systems (Year: 2015).*
Office Action dated Jan. 14, 2016, 10 pages, U.S. Appl. No. 14/703,340, filed May 4, 2015.
Foreign Communication From a Counterpart Application, European Application No. 13877430.2, European Office Action dated May 10, 2016, 6 pages.
Jayasinghe, D., "Improving Performance and Availability of Services Hosted on IaaS Clouds with Structural Constraint-aware Virtual Machine Placement," IEEE International Conference on Services Computing, Jul. 4, 2011, pp. 72-79.
Foreign Communication From a Counterpart Application, European Application No. 13877430.2, Extended European Search Report dated Jun. 12, 2015, 8 pages.
Office Action dated Aug. 28, 2015, 18 pages, U.S. Appl. No. 14/703,340, filed May 4, 2015.
Partial English Translation and Abstract of Chinese Patent Application No. CN101267334A, Sep. 15, 2014, 50 pages.
Partial English Translation and Abstract of Chinese Patent Application No. CN101650667A, Sep. 15, 2014, 12 pages.
Foreign Communication From a Counterpart Application, PCT Application No. PCT/CN2013/085820, International Search Report dated Jul. 18, 2014, 7 pages.
Foreign Communication From a Counterpart Application, PCT Application No. PCT/CN2013/085820, Written Opinion dated Jul. 18, 2014, 8 pages.

* cited by examiner

METHOD, SYSTEM AND APPARATUS FOR CREATING VIRTUAL MACHINE

CROSS-REFERENCE TO RELATED APPLICATIONS

This application is a continuation of International Patent Application No. PCT/CN2013/085820, filed on Oct. 23, 2013, which is hereby incorporated by reference in its entirety.

TECHNICAL FIELD

Embodiments of the present invention relate to computer technologies, and in particularly, to a method, a system, and an apparatus for creating a virtual machine.

BACKGROUND

A cloud computing system mainly includes a cloud application layer, a cloud virtualization layer, and a physical device layer. The cloud virtualization layer creates a virtual machine (VM) according to a physical resource on a physical device layer, and these virtual machines run various applications on the cloud application layer separately or provide services to them. One cloud application may be distributed in one or more virtual machines, and one or more virtual machines corresponding to one cloud application may be grouped into one virtual machine cluster.

Currently, some cluster software exists, for example, a distributed application mainly considers high availability and high reliability of an application, for example, cluster software like Hadoop. Hadoop is capable of performing distributed processing on mass data, and making full use of high speed computing power and storage of a cluster. Hadoop implements a distributed file system Hadoop Distributed File System (HDFS), and can maintain a plurality of working data replicas. For three most common data replication blocks, the principle of the HDFS is that a first replication block is stored in different nodes of a same physical rack, and a last replication block is stored in one node of different physical racks. Because of the request of high reliability and high availability of cluster software, allocating a virtual machine to this type of cluster software to perform service creation, and running a service by the cluster software according to an allocated virtual machine are difficulties during combination of a virtualization technology with the cluster software.

The cluster software is designed based on a physical machine cluster. However, in the virtualization technology, a resource of the virtual machine is flexibly scheduled by a cloud virtualization layer according to a physical resource on a physical device layer. For example, physical resources forming a virtual machine may come from different physical machines on different physical racks. Therefore, the cloud virtualization layer in prior art cannot create a virtual machine meeting a running requirement of cluster software, for example, a distributed application.

SUMMARY

Embodiments of the present invention provide a method, an apparatus, and a system for creating a virtual machine, which are used to create a virtual machine satisfying a running requirement of a distributed application for the distributed application.

According to a first aspect, an embodiment of the present invention provides a method for creating a virtual machine, including receiving a virtual machine creation request, where the virtual machine creation request is used to create a plurality of virtual machines; determining a plurality of virtual machine groups, where the plurality of virtual machine groups is obtained by grouping the plurality of virtual machines, and each virtual machine group includes at least one virtual machine; determining a home physical rack for each virtual machine group, where one virtual machine group corresponds to one home physical rack; and creating each virtual machine group on the home physical rack of each virtual machine group.

With reference to the first aspect, in a first possible implementation manner, different virtual machines in each virtual machine group are created in different physical machines on the home physical rack.

With reference to the first aspect or the first possible implementation manner of the first aspect, in a second possible implementation manner, one home physical rack is determined for each virtual machine group according to configuration information of each virtual machine group, where the configuration information of each virtual machine group includes the number of virtual machines included in each virtual machine group and a specification of each of the virtual machines.

With reference to the second possible implementation manner of the first aspect, in a third possible implementation manner, a current virtual machine group on a to-be-allocated home physical rack is determined, idle physical racks on a physical device layer are acquired, first physical racks whose idle resources meet a resource required by the current virtual machine group are selected from the idle physical racks according to the number of virtual machines included in each virtual machine group and the specification of each of the virtual machines, and one first physical rack is selected from the first physical racks as the home physical rack.

With reference to the third possible implementation manner of the first aspect, in a fourth possible implementation manner, constraint information of the virtual machine group is acquired, allocation record information of the home physical rack is acquired, where the allocation record information includes a correspondence between the virtual machine group of the allocated home physical rack and the home physical rack, and one first physical rack is selected, according to the allocation record information and the constraint information of the virtual machine group, from the first physical racks as the home physical rack of the current virtual machine group.

With reference to the first aspect or the first possible implementation manner of the first aspect, in a fifth possible implementation manner, constraint information of the virtual machine group is acquired, where the constraint information of the virtual machine group denotes an association relationship or a mutex relationship between the plurality of virtual machine groups, and one home physical rack is determined for each virtual machine group according to the constraint information of the virtual machine group.

With reference to the fourth possible implementation manner of the first aspect or the fifth possible implementation manner of the first aspect, in a sixth possible implementation manner, the constraint information of the virtual machine group includes different virtual machine groups correspond to different home physical racks; and one different home physical rack is determined for each virtual machine group.

With reference to the first aspect or any one possible implementation manner of the first aspect, in a seventh possible implementation manner, the method further includes acquiring an identifier of each virtual machine group, and providing the identifier of each virtual machine group to an application module, so that the application module processes a service according to the identifier of each virtual machine group.

According to a second aspect, an embodiment of the present invention provides a method for creating a virtual machine, including receiving a virtual machine creation request, where the virtual machine creation request is used to create a plurality of virtual machines for a distributed application; determining a plurality of virtual machine groups, where the plurality of virtual machine groups is obtained by grouping the plurality of virtual machines, and each virtual machine group includes at least one virtual machine; acquiring configuration information of each virtual machine group, where the configuration information of each virtual machine group includes the number of virtual machines included in each virtual machine group and a specification of each of the virtual machines; determining a deployment attribute of the virtual machine group according to a running attribute of the distributed application; and creating each virtual machine group according to the configuration information of each virtual machine group and the deployment attribute of the virtual machine group.

With reference to the second aspect, in a first possible implementation manner, a virtual machine rack attribute of the virtual machine group is determined according to a rack awareness attribute of the distributed application, where the virtual machine rack attribute denotes that one virtual machine group corresponds to one home physical rack; and one home physical rack is determined for each virtual machine group according to the virtual machine rack attribute of the virtual machine group; and each virtual machine group on the home physical rack of each virtual machine group is created according to the configuration information of each virtual machine group.

With reference to the first possible implementation manner of the second aspect, in a second possible implementation manner, different virtual machines in each virtual machine group are created in different physical machines on the home physical rack according to the configuration information of each virtual machine group.

With reference to the second aspect or the first possible implementation manner of the second aspect, in a third possible implementation manner, one different home physical rack is determined for each virtual machine group according to the virtual machine rack attribute of the virtual machine group.

According to a third aspect, an embodiment of the present invention provides an apparatus for creating a virtual machine, including a receiving unit configured to receive a virtual machine creation request, where the virtual machine creation request is used to create a plurality of virtual machines; a grouping unit configured to determine a plurality of virtual machine groups, where the plurality of virtual machine groups is obtained by grouping the plurality of virtual machines, and each virtual machine group includes at least one virtual machine; a configuring unit configured to determine a home physical rack for each virtual machine group, where one virtual machine group corresponds to one home physical rack; and a creating unit configured to create each virtual machine group on the home physical rack of each virtual machine group.

With reference to the third aspect, in a first possible implementation manner, the creating unit is configured to create, in different physical machines on the home physical rack, different virtual machines in each virtual machine group.

With reference to the third aspect or the first possible implementation manner of the third aspect, in a second possible implementation manner, the configuring unit is configured to determine one home physical rack for each virtual machine group according to configuration information of each virtual machine group, where the configuration information of each virtual machine group includes the number of virtual machines included in each virtual machine group and a specification of each of the virtual machines.

With reference to the second possible implementation manner of the third aspect, in a third possible implementation manner, the configuring unit includes a determining subunit configured to determine a current virtual machine group on a to-be-allocated home physical rack; acquire idle physical racks on a physical device layer; and select, from the idle physical racks according to the number of virtual machines included in each virtual machine group and the specification of each of the virtual machines, first physical racks whose idle resources can meet a resource required by the current virtual machine group; and a selecting subunit configured to select one first physical rack from the first physical racks as the home physical rack.

With reference to the third possible implementation manner of the third aspect, in a fourth possible implementation manner, the selecting subunit is configured to acquire constraint information of the virtual machine group; acquire allocation record information of the home physical rack, where the allocation record information includes a correspondence between the virtual machine group of the allocated home physical rack and the home physical rack; and select, according to the allocation record information and the constraint information of the virtual machine group, one first physical rack from the first physical racks as the home physical rack of the current virtual machine group.

With reference to the third aspect or the first possible implementation manner of the third aspect, in a fifth possible implementation manner, the configuring unit is configured to acquire constraint information of the virtual machine group, where the constraint information of the virtual machine group denotes an association relationship or a mutex relationship between the plurality of virtual machine groups; and determine one home physical rack for each virtual machine group according to the constraint information of the virtual machine group.

With reference to the fourth possible implementation manner of the third aspect or the fifth possible implementation manner of the third aspect, in a sixth possible implementation manner, the constraint information of the virtual machine group includes different virtual machine groups correspond to different home physical racks; and the configuring unit determines one different home physical rack for each virtual machine group.

With reference to the third aspect or any one possible implementation manner of the third aspect, in a seventh possible implementation manner, the apparatus further includes a sending unit configured to acquire an identifier of each virtual machine group, and provide the identifier of each virtual machine group to an application module, so that the application module processes a service according to the identifier of each virtual machine group.

According to a fourth aspect, an embodiment of the present invention provides an apparatus for creating a virtual machine, including a receiving unit configured to receive a virtual machine creation request, where the virtual machine creation request is used to create a plurality of virtual machines for a distributed application; a grouping unit configured to determine a plurality of virtual machine groups, where the plurality of virtual machine groups is obtained by grouping the plurality of virtual machines, and each virtual machine group includes at least one virtual machine; an acquiring unit configured to acquire configuration information of each virtual machine group, where the configuration information of each virtual machine group includes the number of virtual machines included in each virtual machine group and a specification of each of the virtual machines; a determining unit configured to determine a deployment attribute of the virtual machine group according to a running attribute of the distributed application; and a creating unit configured to create each virtual machine group according to the configuration information of each virtual machine group and the deployment attribute of the virtual machine group.

With reference to the fourth aspect, in a first possible implementation manner, the determining unit is configured to determine a virtual machine rack attribute of the virtual machine group according to a rack awareness attribute of the distributed application, where the virtual machine rack attribute denotes that one virtual machine group corresponds to one home physical rack; the creating unit is configured to determine one home physical rack for each virtual machine group according to the virtual machine rack attribute of the virtual machine group; and create each virtual machine group on the home physical rack of each virtual machine group according to the configuration information of each virtual machine group.

According to a fifth aspect, an embodiment of the present invention provides a system for creating a virtual machine, including a cloud virtualization apparatus configured to receive a virtual machine creation request, where the virtual machine creation request is used to create a plurality of virtual machines; determine a plurality of virtual machine groups, where the plurality of virtual machine groups is obtained by grouping the plurality of virtual machines, and each virtual machine group includes at least one virtual machine; determine a home physical rack for each virtual machine group, where one virtual machine group corresponds to one home physical rack; create each virtual machine group on the home physical rack of each virtual machine group; acquire an identifier of each virtual machine group, and provide the identifier of each virtual machine group to an application apparatus; and the application apparatus configured to receive the identifier of each virtual machine group, and process a service according to the identifier of each virtual machine group.

In the embodiments of the present invention, when a plurality of virtual machines are created for a distributed application, firstly it is determined that the plurality of virtual machines are grouped to obtain a plurality of virtual machine groups, one home physical rack is allocated to each virtual machine group, and each virtual machine group is created on the home physical rack of each virtual machine group. Because each virtual machine group is created on the home physical rack, virtual machines in each virtual machine group share a same home physical rack, so that each virtual machine group corresponds to one physical rack. Using this virtual machine creation manner, a deployment attribute of each of the virtual machines in each virtual machine group can meet a rack awareness attribute of the distributed application, to create a virtual machine cluster meeting a running requirement of a distributed application for the distributed application. Moreover, in the embodiments of the present invention, the distributed application may be implemented in combination with a virtualization technology without being changed, and it is ensured that the performance of the distributed application is not affected.

BRIEF DESCRIPTION OF DRAWINGS

To describe the technical solutions in the embodiments of the present invention more clearly, the following briefly introduces the accompanying drawings required for describing the embodiments. The accompanying drawings in the following description are merely some embodiments of the present invention, and a person of ordinary skill in the art may still derive other drawings from these accompanying drawings without creative efforts.

DESCRIPTION OF EMBODIMENTS

Embodiments of the present invention provide a method, an apparatus, and a system for creating a virtual machine, and a created virtual machine cluster can meet a running requirement of a distributed application.

Figure 1:
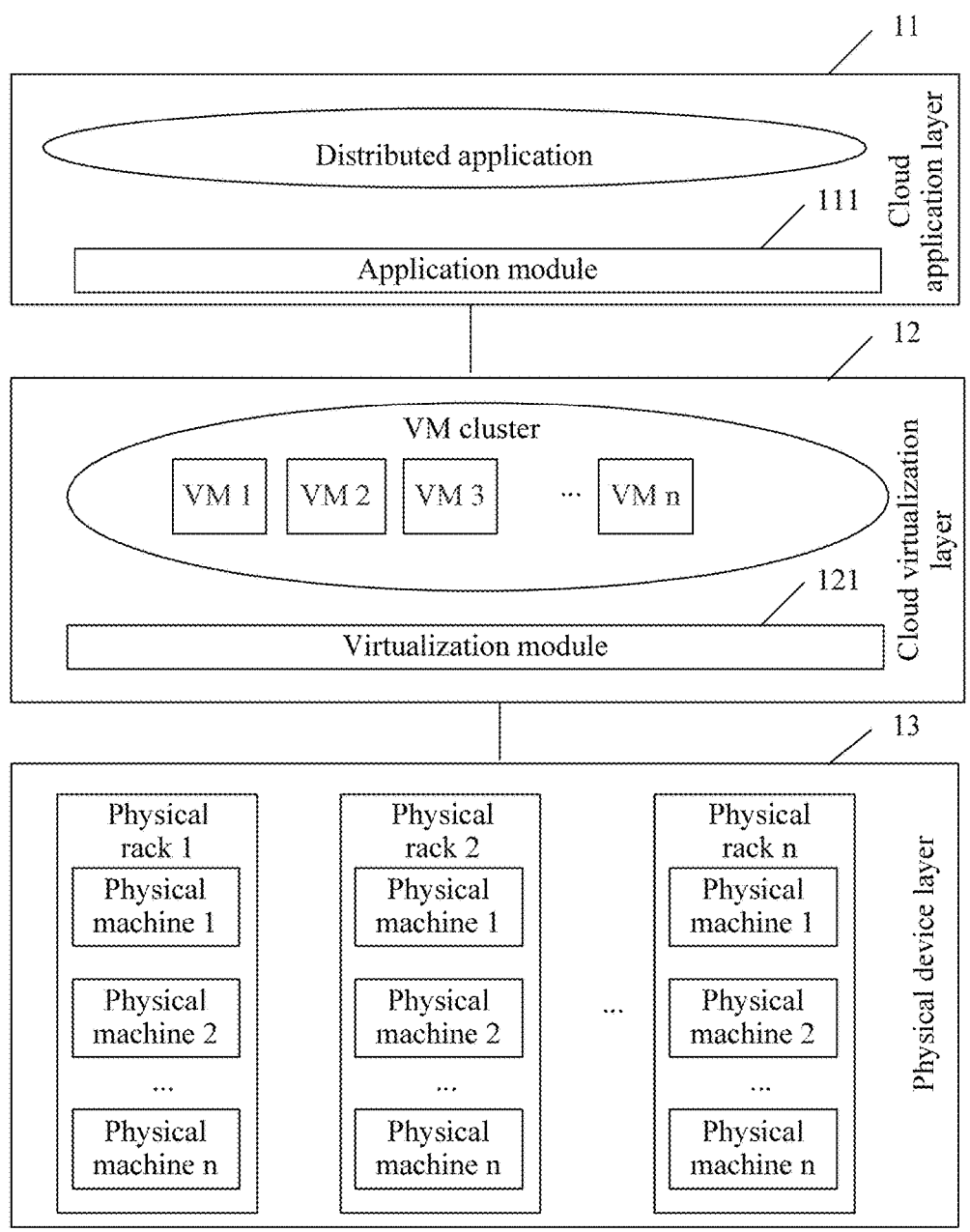
FIG. 1 is a constitutional diagram of an architecture of a virtual machine system according to an embodiment of the present invention.

As shown in FIG. 1, which is an example of an architectural diagram of a virtual machine system according to an embodiment of the present invention, the virtual machine system in this example includes a cloud application layer 11, a cloud virtualization layer 12, and a physical device layer 13.

A distributed application may run on the cloud application layer 11, and the distributed application includes, but is not limited to, distributed cluster software such as the HDFS software and the like. On the cloud application layer 11, a service processing module executing an application is an application module 111.

The cloud virtualization layer 12 is configured to abstract a physical resource on the physical device layer 13 into a plurality of the virtual machines according to a requirement of the cloud application layer 11, and manage the virtual machines. A module performs virtual machine creation/construction/abstracting on the cloud virtualization layer 12 is referred to as a virtualization module in the embodiment of the present invention, for example, a virtualization module 121 shown in FIG. 1.

The physical device layer 13 includes one or more physical racks, and each physical rack includes one or more physical machines. A physical resource provided by each physical machine may include one or more of a central processing unit (CPU) resource, a memory resource, a storage resource, and a network resource. The physical resource provided by the physical device layer 13 is abstracted by the virtualization module 121 into a plurality of virtual machines, and the virtual machines are provided to a corresponding distributed application to provide a service.

Figure 2:
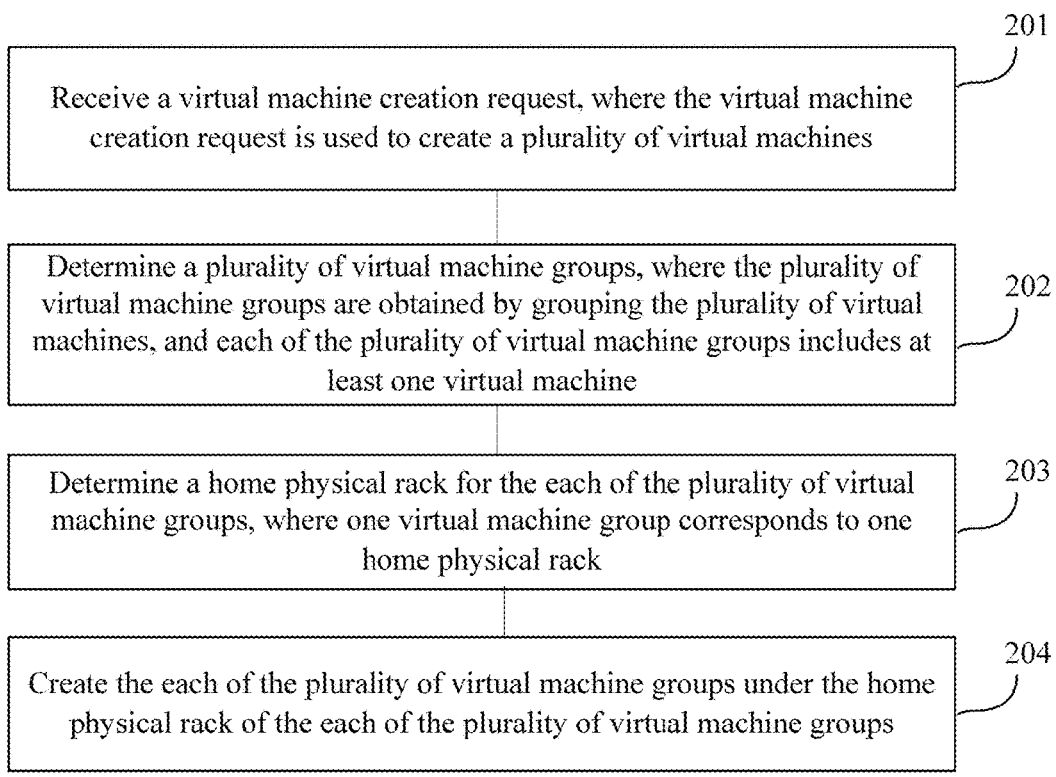
FIG. 2 is a flowchart of a method according to an embodiment of the present invention.

With reference to FIG. 1, as shown in FIG. 2, which is a flowchart of creating a virtual machine according to an embodiment of the present invention, the method according to the embodiment of the present invention includes:

Step 201: Receive a virtual machine creation request, where the virtual machine creation request is used to create a plurality of virtual machines.

The virtual machine creation request may carry configuration information of the plurality of virtual machines.

In specific implementation, a virtualization module may receive the virtual machine creation request, the virtual machine creation request may be creation requests of a plurality of virtual machine groups, each virtual machine group includes at least one virtual machine, and the virtual machine creation request may further be creation requests of a plurality of virtual machines. Specific implementation manners of the creation requests of the plurality of virtual machine groups or the creation requests of the plurality of virtual machines may be flexible, which may be creating a plurality of virtual machine groups or a plurality of virtual machines using one request, and may be creating a plurality of virtual machine groups or a plurality of virtual machines using a plurality of requests. Preferably, one virtual machine group or one virtual machine is created using one request, and specific implementation is not limited in the embodiment of the present invention.

The configuration information of each of the virtual machines may include configuration information such as a computing resource (for example, a CPU), a storage resource (for example, a memory) or a network resource (for example, a network Internet Protocol (IP) address) of the virtual machine. For example, the creation request of each virtual machine group indicates the number of virtual machines included in each virtual machine group and a specification of each of the virtual machines or the creation request of each of the virtual machines denotes a specification of each of the virtual machines.

Step 202: Determine a plurality of virtual machine groups, where the plurality of virtual machine groups is obtained by grouping the plurality of virtual machines, and each virtual machine group includes at least one virtual machine.

Further, when the virtualization module receives creation requests of a plurality of virtual machine groups, the plurality of virtual machine groups may be determined according to the creation requests of the plurality of virtual machine groups. When the virtualization module receives creation requests of a plurality of virtual machines, the virtualization module may first group the plurality of virtual machines into a plurality of virtual machine groups, and then determine information of the virtual machine group according to a grouping result.

Step 203: Determine a home physical rack for each virtual machine group, where one virtual machine group corresponds to one home physical rack.

Based on the requirement of a running attribute of a distributed application, the virtualization module in the embodiment of the present invention considers the running attribute of the distributed application when creating a virtual machine for the distributed application, performs adaptation according to the running attribute of the distributed application, and generates a deployment attribute of a virtual machine group adapted to the running attribute of the distributed application. For example, the running attribute of the distributed application is adapted according to a rack awareness attribute in the running attribute of the distributed application, and it is determined that the deployment attribute of the virtual machine group includes the virtual machine rack attribute. That is, one virtual machine group may be simulated as one virtual machine rack, and one virtual machine rack may be equivalent to one physical rack. According to the virtual machine rack attribute of the virtual machine group, each virtual machine group corresponds to one home physical rack, and each virtual machine group is created or deployed on a corresponding home physical rack of each virtual machine group.

Therefore, the virtualization module determines one home physical rack for each virtual machine group. Further, the virtualization module may determine one home physical rack for each virtual machine group according to configuration information of each virtual machine group, or may allocate one home physical rack to each virtual machine group randomly or by taking turns. In actual deployment, if the physical resource of the allocated home physical rack cannot meet a resource requirement of the virtual machine group, another home physical rack may be allocated.

Step 204: Create each virtual machine group on the home physical rack of each virtual machine group.

Further, a resource of a physical machine on the home physical rack may be used to create each of virtual machines in each virtual machine group.

In the embodiment of the present invention, when creating a plurality of virtual machines for a distributed application, firstly, a virtualization module determines that the plurality of virtual machines are grouped to obtain a plurality of virtual machine groups, then allocates one home physical rack to each virtual machine group, and create each virtual machine group on the home physical rack of each virtual machine group. Because each virtual machine group is created on the home physical rack to which each virtual machine group belongs, virtual machines in each virtual machine group share a same home physical rack, so that each virtual machine group corresponds to one physical rack. Using this virtual machine creation manner, a deployment attribute of each of the virtual machines in each virtual machine group can meet a rack awareness attribute of the distributed application to create a virtual machine cluster meeting a running requirement of a distributed application for the distributed application. Moreover, in the embodiment of the present invention, the distributed application may be implemented in combination with a virtualization technology without being changed, and it is ensured that the performance of the distributed application is not affected. In addition, in the embodiment of the present invention, the granularity of the virtual machine group is used to create the virtual machine, and the manner of creating a virtual machine using a virtual machine group is more efficient.

Figure 3:
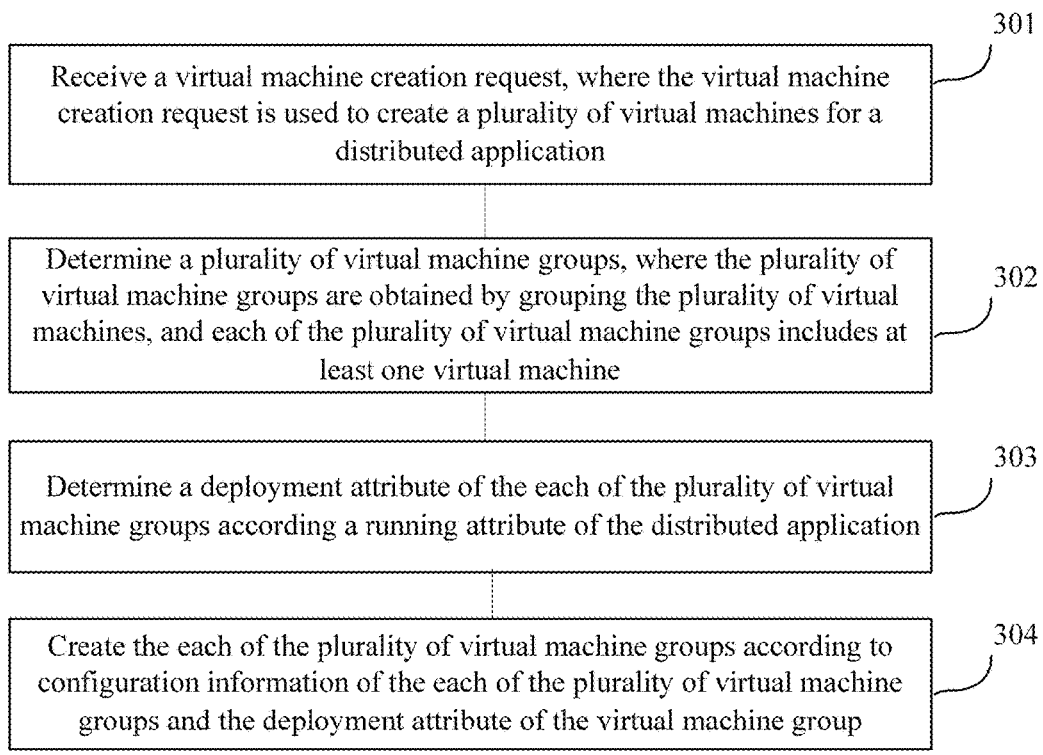
FIG. 3 is a flowchart of another method according to an embodiment of the present invention.

As shown in FIG. 3, which is another flowchart of creating a virtual machine for a distributed application according to an embodiment of the present invention, the method according to the embodiment of the present invention includes:

Step 301: Receive a virtual machine creation request, where the virtual machine creation request is used to create a plurality of virtual machines for a distributed application.

Step 302: Determine a plurality of virtual machine groups, where the plurality of virtual machine groups is obtained by grouping the plurality of virtual machines, and each virtual machine group includes at least one virtual machine.

Step 303: Determine a deployment attribute of each virtual machine group according a running attribute of the distributed application.

Step 304: Create each virtual machine group according to configuration information of each virtual machine group and the deployment attribute of the virtual machine group.

This embodiment is another implementation manner of the present invention, and in step 303, based on a requirement of a running attribute of a distributed application, a virtualization module in the embodiment of the present invention considers the running attribute of the distributed application when creating a virtual machine for the distributed application, performs adaptation according to the running attribute of the distributed application, and generates a deployment attribute of a virtual machine group adapted to the running attribute of the distributed application. In step 304, each virtual machine group may be created according to the configuration information of each virtual machine group and the deployment attribute of each virtual machine group, to meet a running requirement of the distributed application.

Further, the virtualization module may determine a virtual machine rack attribute of the virtual machine group according to a rack awareness attribute of the distributed application, where the virtual machine rack attribute denotes that one virtual machine group corresponds to one home physical rack; and the virtualization module determines one home physical rack for each virtual machine group according to configuration information of each virtual machine group, and creates each virtual machine group on the home physical rack of each virtual machine group, that is, different virtual machines in one virtual machine group are created on a same physical rack.

In the embodiment of the present invention, that a plurality of cluster software and different running attributes of different cluster software exist in the industry is taken into consideration, an adaptation layer is added in the virtualization module to create a virtual machine cluster meeting a distributed application, so that the distributed application can be implemented in combination with a virtualization technology without being changed, and it is ensured that the performance of the distributed application is not affected.

Further, in another embodiment of the present invention, after step 204 or step 304, the following steps may further be performed:

Step 205/305: Acquire an identifier of each virtual machine group.

The virtualization module may allocate one identifier to each virtual machine group, to stand for each virtual machine group.

Step 206/306: Provide the identifier of each virtual machine group to an application module on an upper layer, so that the application module on the upper layer processes a service according to the identifier of each virtual machine group.

Further, the virtualization module may send a physical rack number of each of the virtual machines to the application module on the upper layer, where the physical rack number of each of the virtual machines is an identifier of a virtual machine group where each of the virtual machines is located.

In this embodiment, because the identifier of each virtual machine group is further provided to the application module on the upper layer, for example, a distributed application module, when the application module on the upper layer runs in the plurality of virtual machines, the virtual machine group to which each of the virtual machines belongs may be learned, and therefore, network topology information of each node may be acquired, and service processing is performed according to an identifier of the acquired virtual machine group. For example, it is ensured that the same service is not allocated to virtual machines in a same virtual machine group for processing, to meet reliability and availability requirements of an upper layer application.

For a rack awareness attribute of a distributed application and a virtual machine rack attribute of a virtual machine group, details are described in following embodiments.

Figure 4:
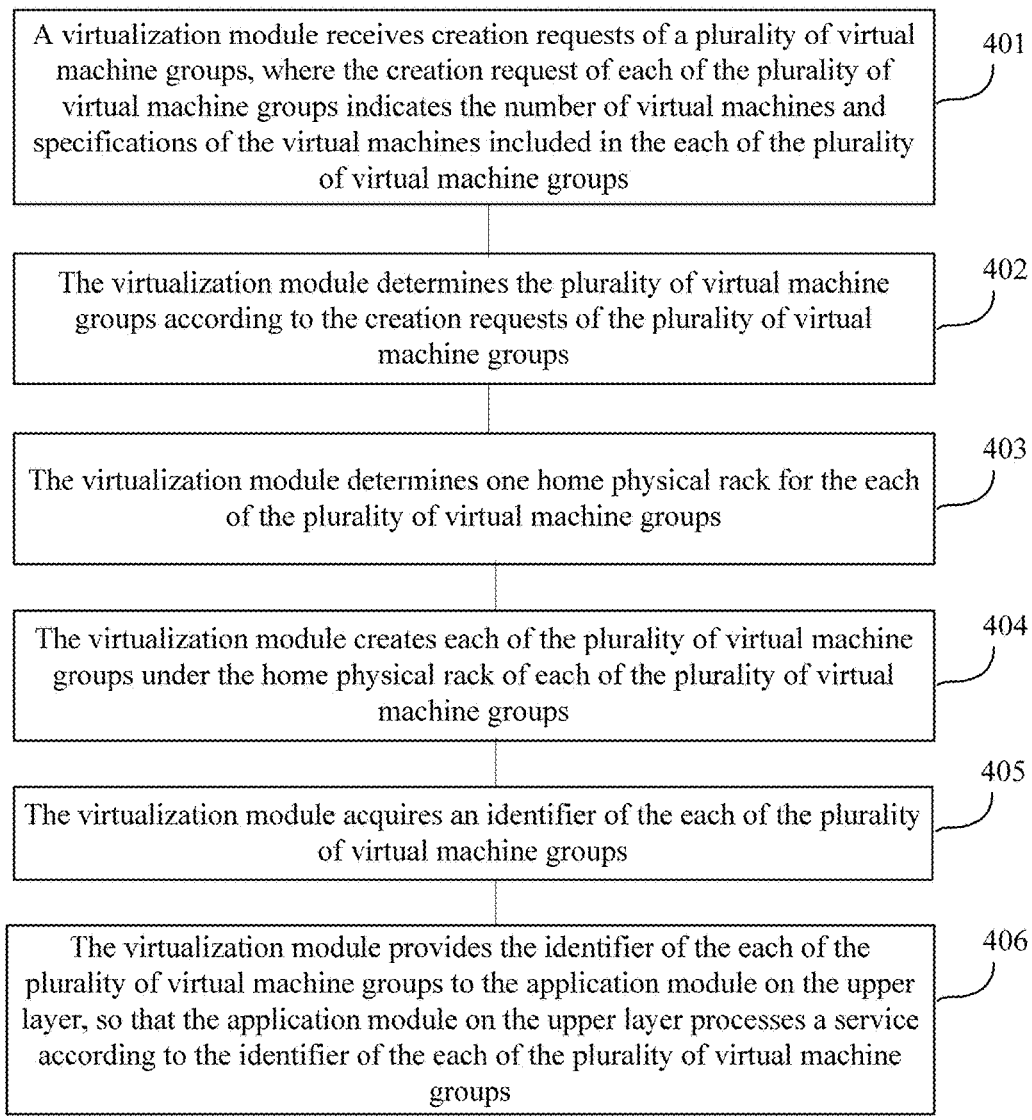
FIG. 4 is a flowchart of still another method according to an embodiment of the present invention.

As shown in FIG. 4, which is still another flowchart of creating a virtual machine for a distributed application according to an embodiment of the present invention, the method according to the embodiment of the present invention includes:

Step 401: A virtualization module receives creation requests of a plurality of virtual machine groups, where the creation request of each virtual machine group indicates the number of virtual machines included in each virtual machine group and a specification of each of the virtual machines.

In this embodiment, the virtualization module no longer provides a creation template of a single virtual machine, but provides a creation template of the distributed application or a creation template of the virtual machine group. The creation template of the distributed application includes a plurality of virtual machine groups, each virtual machine group includes at least one virtual machine, the plurality of virtual machine groups corresponds to one virtual machine cluster, and the virtual machine cluster provides a service to the distributed application. When it is determined that a virtual machine cluster needs to be created for a distributed application, a cloud manager or a user or management software of another distributed application groups a plurality of virtual machines of the virtual machine cluster, and fills each group of virtual machines into a creation template of a virtual machine group. A creation template of each virtual machine group corresponds to one virtual machine group, a virtualization module receives creation templates of a plurality of virtual machine groups, and a creation template of each virtual machine group may include the number of virtual machines, identifiers of the virtual machines and a specification of each of the virtual machines. For example, 15 virtual machines need to be created for a distributed application, and two virtual machines of the 15 virtual machines need to serve as management nodes, and specification information thereof is eight CPUs, 100 gigabit (G) memory, and other virtual machines serve as serving nodes, and specification information thereof is two CPUs, 40 G memory (specifications of the serving nodes may be the same, or may be different, and in this embodiment, this embodiment is described using an example that specifications of the serving nodes are the same). The 15 virtual machines are grouped into three groups, where the virtual machine serving as a management node cannot be set in one group. Therefore, a virtualization module receives creation requests of the three virtual machine node groups, that is, receives creation templates of the three virtual machine groups. The templates are as follows:

A creation template of a first virtual machine group: the number of VMs:5; VM specification: VM1 (8 CPUs, 100 G memory); VM 2 (2 CPUs, 40 G memory); VM 3 (2 CPUs, 40 G memory); VM 4 (2 CPUs, 40 G memory); and VM 5 (2 CPUs, 40 G memory).

A creation template of a second virtual machine group: the number of VMs:5; VM specification: VM6 (8 CPUs, 100 G memory); VM7 (2 CPUs, 40 G memory); VM8 (2 CPUs, 40 G memory); VM9 (2 CPUs, 40 G memory); and VM10 (2 CPUs, 40 G memory).

A creation template of a third virtual machine group: the number of VMs:5; VM specification: VM1 (2 CPUs, 40 G memory); VM12 (2 CPUs, 40 G memory); VM13 (2 CPUs, 40 G memory); VM14 (2 CPUs, 40 G memory), and VM15 (2 CPUs, 40 G memory).

Step 402: The virtualization module determines the plurality of virtual machine groups according to the creation requests of the plurality of virtual machine groups.

For example, determine the three virtual machine groups according to the creation requests of the three virtual machine groups.

Step 403: The virtualization module determines one home physical rack for each virtual machine group.

In this embodiment, after determining a plurality of virtual machine groups, the virtualization module may further configure one home physical rack for each virtual machine group, and the virtual machine in each virtual machine group is created on the home physical rack.

The embodiment of the present invention is directed to creating a virtual machine meeting a running requirement of a distributed application for the distributed application, and features of the distributed application are taken into consideration in the process of creating a virtual machine in the embodiment of the present invention.

Large-scale distributed applications may be distributed on a plurality of physical racks. In this case, the following requirements are generated based on reliability and availability requirements: it is expected that communication between different nodes can be carried out within a same physical rack as much as possible rather than across the physical racks, aiming at minimizing overhead generated during data writing; and a management node places replica of data blocks into the plurality of physical racks as much as possible, aiming at improving a fault tolerance capability and maximizing reliability and availability of the data.

Based on the two requirements, the running attribute of the distributed application includes a rack awareness attribute, and when a distributed application runs, physical rack information in network topology information of each node is acquired using the rack awareness attribute, and service processing is performed according to the obtained physical rack information. For example, with respect to replica placement, a replica placement policy of data blocks is directed to obtaining a balance between the foregoing two requirements, and following rules may be observed: a first replica is placed on a local node; a second replica is placed on different physical racks; a third replica is placed in different physical machines on a local physical rack; and the remaining replicas are randomly placed on the premise of observing the following requirements: one node is placed with one replica at most; and if the number of replicas is less than twice of the number of racks, it is not allowed to place more than two replicas on one rack.

That is, when data reading occurs to the distributed application, the management node needs to obtain rack information of each node to determine, according to the foregoing rules, which node the data replicas are to be placed, and which node runs or processes the data replicas.

When the distributed application is combined with the virtualization technology, a node performing tasks is a virtual machine. Therefore, the distributed application needs to know a rack number of each of the virtual machines to perform service processing. In addition, for which physical machine the virtual machine performing tasks is to be deployed on, specific rules also need to be observed, so that the running requirement of the distributed application can be satisfied.

According to the embodiment of the present invention, based on the requirement of the running attribute of the distributed application, the virtualization module considers the running attribute of the distributed application when creating a virtual machine cluster for the distributed application, an adaptation layer is added, and the running attribute of the distributed application is adapted to generate a deployment attribute of a virtual machine group adapted to the running attribute of the distributed application, so that a created virtual machine cluster can meet the running attribute of the distributed application. For example, the virtual machine rack attribute of the virtual machine group is generated according to the rack awareness attribute of the distributed application. That is, the same virtual machine group corresponds to one home physical rack. A virtual machine in each of the virtual machines node groups is created on a home physical rack of the virtual machine.

In this embodiment, the virtual machine rack attribute of the virtual machine group is used to simulate an attribute of a physical rack, one virtual machine rack may be equivalent to one physical rack, and virtual machines on one virtual machine rack have the same features as physical machines on one physical rack. For example, physical and software resources of each physical machine on each physical rack are independence and do not interfere with each other, but have same power and infrastructure (for example, air conditioning apparatus, and the like). Therefore, correspondingly, each of the virtual machines on each of the virtual racks also has independent physical and software resources that do interfere with each other, and have the same power and infrastructure. Further, if the virtual machine rack attribute of the virtual machine group and the physical rack need to have same features, different virtual machines in a same virtual machine group are created on a same physical rack, that is, physical resources of different virtual machines in one virtual machine group should come from the same physical rack.

The implementation manner of determining one home physical rack for each virtual machine group in step 403 may be various. The virtualization module may first determine one home physical rack for each virtual machine group according to configuration information of each virtual machine group, or may allocate one home physical rack to each virtual machine group randomly or by taking turns. In actual deployment, if the physical resource of the allocated home physical rack cannot meet a resource requirement of the virtual machine group, another home physical rack may be allocated. For example, step 403 may include:

Step 403-1: Determine a current virtual machine group on a to-be-allocated home physical rack.

Step 403-2: Acquire idle physical racks on a physical device layer.

In the embodiment of the present invention, an idle physical rack or an idle physical machine, which mainly refers to a physical rack or a physical machine whose physical resources are not fully occupied, may include a physical rack or a physical machine whose resources are not fully occupied, and may also refers to a physical rack or a physical machine whose resources are partially occupied.

Step 403-3: Select, from the idle physical racks according to the number of virtual machines included in each virtual machine group and a specification of each of the virtual machines, first physical racks whose idle resources meet a resource required by the current virtual machine group.

Step 403-4: Select one first physical rack from the first physical racks as the home physical rack.

In the foregoing process of determining a home physical rack, the virtualization module considers configuration information of each virtual machine group, selects a physical rack whose idle resources meet a resource requirement of the virtual machine group as the home physical rack, thereby ensuring that creating a virtual machine group on a home physical rack can be performed successfully, and improving a creation success rate of the virtual machine group.

Further, in step 403-3, the virtualization module may further determine if a resource of each physical machine in a physical rack satisfies a resource requirement of each of the virtual machines, and performs further selection on the home physical rack, so that each physical machine of the determined home physical rack can create each of the virtual machines of a corresponding virtual machine group, and the success creation of the virtual machine can further be ensured. For example, step 403-3 may be performed in the following manners:

Step 403-3-1: Determine the number of idle physical machines on each of the idle physical racks.

Step 403-3-2: Select a second physical rack from the idle physical racks according to the number of virtual machines included in the current virtual machine group, where the number of idle physical machines on the second physical rack is greater than or equal to the number of virtual machines included in the current virtual machine group.

Step 403-3-2: Select the first physical rack from the second physical racks according to the specification of each of the virtual machines included in the current virtual machine group, where an idle physical resource of the idle physical machine on the first physical rack satisfies a resource requirement of each of the virtual machines in the current virtual machine group.

In the process of determining one home physical rack for each virtual machine group in step 403, in addition to the configuration information of each virtual machine group, the constraint information of the virtual machine group may further be considered, where the constraint information of the virtual machine group indicates an association relationship or a mutex relationship between the plurality of virtual machine groups. Certainly, the virtualization module may also determine one home physical rack for each virtual machine group only according to the constraint information of the virtual machine group.

With respect to the distributed application, one piece of cluster software usually may include a plurality of redundant software examples (corresponding to the virtual machines), and a topological relationship of the software examples is complex. For example, with respect to the Hadoop software, management nodes may not be on a same physical rack, to ensure the service reliability. Therefore, when creating a virtual machine cluster for the distributed application, the virtualization module may acquire constraint information of the virtual machine group, where the constraint information of the virtual machine group is used to indicate creation of an association relationship or a mutex relationship between the plurality of virtual machine groups. For example, some virtual machine groups need to be created in the same physical machine or on the same physical rack, and some virtual machine groups need to be created in the different physical machine or on the different physical rack.

Preferably, a implementation manner is as follows: step 403-4: select one first physical rack from the first physical racks as a home physical rack of the current virtual machine group, which may be specifically performed according to the following manners:

Step 403-4-1: Acquire constraint information of the virtual machine group.

Preferably, the constraint information of the virtual machine group in this embodiment may be sent to the virtualization module together with creation requests of a plurality of virtual machine groups. The foregoing example is used as an example again, for example, a management node needs to perform creation across physical racks, and therefore, the virtualization module receives the following constraint information of the virtual machine group:

The first virtual machine group and the second virtual machine group cannot be created on a same physical machine rack.

In implementation, the constraint information of the virtual machine group may be specified directly in a creation template of the plurality of virtual machine groups, or may be sent the virtualization module as an independent message, or may be determined by the virtualization module according to attribute information of the distributed application and a corresponding rule, which is not limited in the embodiment of the present invention.

Step 403-4-2: Acquire allocation record information of the home physical rack, where the allocation record information includes a correspondence between the virtual machine group of the allocated home physical rack and the home physical rack.

Step 403-4-3: Select, according to the allocation record information and the constraint information of the virtual machine group, one first physical rack from the first physical racks as the home physical rack of the current virtual machine group.

For example, according to constraint information of the virtual machine group that the first virtual machine group and the second virtual machine group cannot be created on the same physical machine rack, the home physical rack of the first virtual machine group selects a first physical rack, and the home physical rack of the second virtual machine group selects a second physical rack.

In addition, because of a higher reliability requirement of the distributed application, for example, at least one same data replica needs to be placed on different physical racks, the constraint information of the virtual machine group may further be set as different virtual machine groups correspond to different home physical racks. The virtualization module determines one different home physical rack for each virtual machine group according to the constraint information of the virtual machine group. For example, the home physical rack of the first virtual machine group is a physical rack 3, the home physical rack of the second virtual machine group is a physical rack 1, and the home physical rack of the third virtual machine group is a physical rack 2.

Step 404: The virtualization module creates each virtual machine group on the home physical rack of each virtual machine group.

The virtualization module creates each of the virtual machines of each virtual machine group on the home physical rack of each virtual machine group according to the configuration information of each virtual machine group, for example, the number of virtual machines included in each virtual machine group and the specification of each of the virtual machines. Further, the virtualization module schedules a physical resource on a physical device layer according to the number of virtual machines in each virtual machine group and the specification of each of the virtual machines, to create each of the virtual machines in each virtual machine group.

Further, in step 404, the virtualization module may further create, in different physical machines on the home physical rack, different virtual machines in each virtual machine group, that is, the virtualization module creates, in different physical machines on the same physical rack, different virtual machines in one virtual machine group, for example:

The first virtual machine group is created on the physical rack 3, VM 1 is created on the physical machine 1 of the physical rack 3, VM 2 is created on the physical machine 2 of the physical rack 3, VM 3 is created on the physical machine 3 of the physical rack 3, VM 4 is created on the physical machine 4 of the physical rack 3, and VM 5 is created on the physical machine 5 of the physical rack 3.

The second virtual machine group is created on the physical rack 1, VM 6 is created on the physical machine 1 of the physical rack 1, VM 7 is created on the physical machine 2 of the physical rack 1, VM 8 is created on the physical machine 3 of the physical rack 1, VM 9 is created on the physical machine 4 of the physical rack 1, and VM 10 is created on the physical machine 5 of the physical rack 1.

The third virtual machine group is created on the physical rack 2, VM 11 is created on the physical machine 1 of the physical rack 2, VM 12 is created on the physical machine 2 of the physical rack 2, VM 13 is created on the physical machine 3 of the physical rack 2, VM 14 is created on the physical machine 4 of the physical rack 2, and VM 15 is created on the physical machine 5 of the physical rack 2.

The foregoing virtualization module creates, in different physical machines of the same home physical rack, different virtual machines of the same virtual machine groupon, thereby ensuring that the virtual machine group further has the same attribute as the physical rack, so that the virtual machine group can meet a running requirement of higher reliablity of a distributed application.

Step 405: The virtualization module acquires an identifier of each virtual machine group.

The virtualization module may allocate a virtual machine group identifier to each virtual machine group, for example, a virtual machine group identifier allocated by the virtualization module for the first virtual machine group is Virtual Rack (VR) 1; a virtual machine group identifier allocated to the second virtual machine group is VR 2; and a virtual machine group identifier allocated to the third virtual machine group is VR 3.

The step 406 may be performed after the virtualization module determines a plurality of virtual machine groups, and the description in the embodiment of the present invention herein does not limit a sequence during implementation thereof.

Certainly, the virtualization module may not need to allocate an identifier to the virtual machine group, but acquire an identifier of the virtual machine group carried in the creation request of each virtual machine group.

Step 406: The virtualization module provides the identifier of each virtual machine group to an application module on an upper layer, so that the application module on the upper layer processes a service according to the identifier of each virtual machine group.

Further, the virtualization module provides the identifier of each virtual machine group to the distributed application.

The rack awareness of the distributed application is not adaptive. Firstly, a manager of the distributed application adopts a tree-like network topology structure to manage each node of the distributed application, for example, the distributed application is formed by a plurality of data center (DC), and each data center has a plurality of racks, where each rack has a plurality of physical machines. Each node may represent its position in the network topology structure via the following forms. For example, the position of R1 may be denoted as /D1/R1, and the position of N12 may be denoted as /D2/R4/N12. Secondly, the management node is informed of a network topology relationship of each serving node.

Therefore, the virtualization module may further provide the identifier of each virtual machine group to the distributed application, so that the distributed application processes a service according to the identifier of each virtual machine group.

For example, the virtualization module returns a virtual machine creation result, including VR 1 (VM 1, VM 2, VM 3, VM 4, and VM 5), VR 2 (VM 6, VM 7, VM 8, VM 9, and VM 10), and VR 3 (VM 11, VM 12, VM 13, VM 14, and VM 15)

Preferably, the virtualization module may use the identifier of a virtual machine group which each of the plurality of virtual machine belongs to as a rack number of each of the virtual machines, and provide the rack number to the distributed application.

Further, the virtualization module may provide information of the physical rack where each of the plurality of virtual machine is deployed to the distributed application. For example, the virtualization module returns the following information: VR 1-Rack1, VR 2-Rack2 and VR 3-Rack3.

Figure 5:
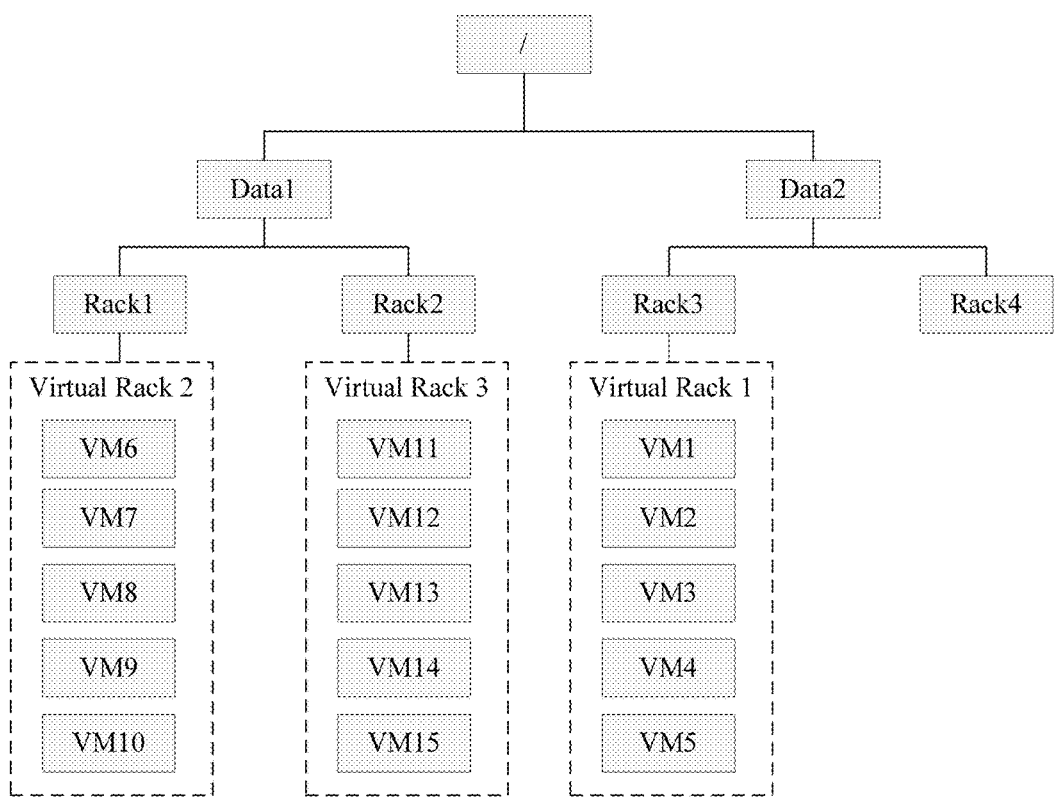
FIG. 5 is a network topology structural diagram of a virtual machine cluster created according to an embodiment of the present invention.

Upon acquiring the identifier of each virtual machine group, the distributed application may establish a network topology structure of each of the virtual machines, and configure a network topology result to a management node of the distributed application, so that the management node performs service processing according to the network topology structure of each of the virtual machines. As shown in FIG. 5, a network topology structural diagram of a virtual machine group which is created by the application module and provides services to a distributed application according to the embodiment of the present invention is given. For example, VM 1 serves as a management node, and when data is received, processing is performed according to the network topology structure of each of the virtual machines: a first replica is placed on a local node, such as VM 1; a second replica is placed on different physical racks, such as VM 7 in VMG 2; and a third replica is placed in different physical machines on a physical rack, such as VM 2 in VMG1.

In the embodiment of the present invention, when a virtualization module creates a plurality of virtual machines for a distributed application, firstly it is determined that the plurality of virtual machines are grouped to obtain a plurality of virtual machine groups, one home physical rack is allocated to each virtual machine group, and each virtual machine group is created on the home physical rack of each virtual machine group. Because each virtual machine group is created on the home physical rack, the virtual machines in each virtual machine group belong to the same home physical rack, so that each virtual machine group corresponds to one physical rack. Using this virtual machine creation manner, a deployment attribute of each of the virtual machines in each virtual machine group satisfies a rack awareness attribute of the distributed application. In this way, a virtual machine cluster meeting a running requirement of a distributed application is created for the distributed application. Moreover, in the embodiment of the present invention, that a plurality of cluster software and different running attributes of different cluster software exist in the industry is taken into consideration; an adaptation layer is added in the virtualization module to create a virtual machine cluster meeting a distributed application, so that the distributed application can be implemented in combination with a virtualization technology without being changed, and it is ensured that the performance of the distributed application is not affected. In addition, in the embodiment of the present invention, the granularity of the virtual machine group is used to create the virtual machine, and the manner of creating a virtual machine using a virtual machine group is more efficient.

In this embodiment, because the identifier of each virtual machine group is further provided to the application module on the upper layer, for example, a distributed application module, when the application module on the upper layer runs on in the plurality of virtual machines, the virtual machine group to which each of the virtual machines belongs may be learned, and therefore, network topology information of each node may be acquired, and service processing is performed according to an identifier of the acquired virtual machine group. For example, it is ensured that the same service is not allocated to virtual machines in a same virtual machine group for processing, to meet the reliability and availability request of an application on the upper layer.

In addition, in this embodiment, the virtualization module further considers the constraint information of the virtual machine group to create the virtual machine group, so that a plurality of virtual machine groups belonging to one distributed application do not share a physical rack. That is, any two virtual machine groups are not created on one physical rack, and the virtual machine cluster created in this way can meet a running requirement of higher reliablity of a distributed application.

Further, in this embodiment, the virtualization module creates, in different physical machines on the same home physical rack, different virtual machines of the same virtual machine group, thereby ensuring that the virtual machine group further has the same attribute as the physical rack, so that the virtual machine group can meet a running requirement of higher reliablity of a distributed application Further, in this embodiment, the virtualization module no longer provides a creation template of a single virtual machine, but provides a creation template of the distributed application or a creation template of the virtual machine group, thereby providing a more convenient manner for creating a virtual machine cluster.

Figure 6:
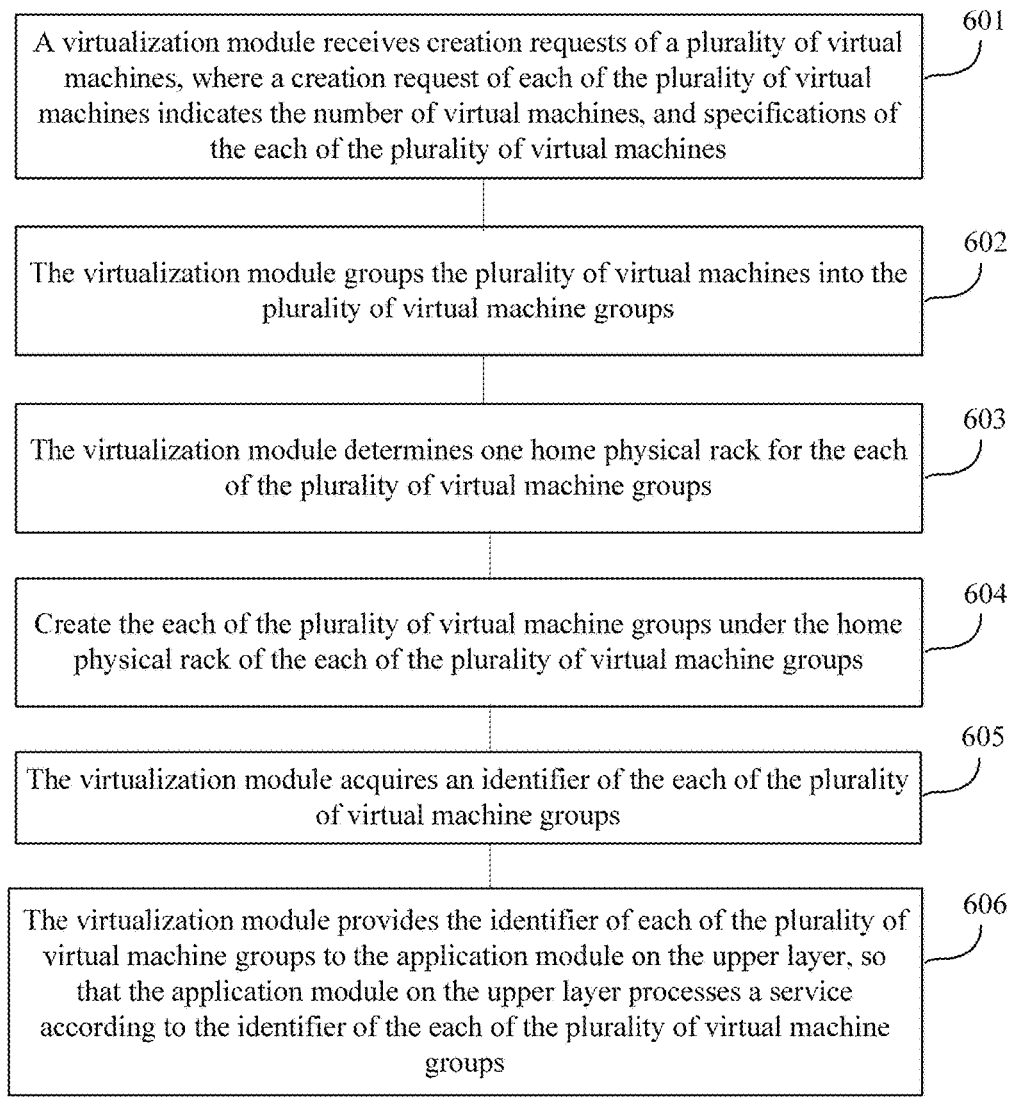
FIG. 6 is a flowchart of yet another method according to an embodiment of the present invention.

As shown in FIG. 6, which is still another flowchart of creating a virtual machine group according to an embodiment of the present invention, the method according to the embodiment of the present invention includes:

Step 601: A virtualization module receives creation requests of a plurality of virtual machines, where a creation request of each of the virtual machines indicates the number of virtual machines, and a specification of each of the virtual machines.

The plurality of virtual machines are grouped into one virtual machine cluster, where the virtual machine cluster provides a service to a distributed application In this embodiment, the virtualization module provides a creation template of a single virtual machine, a cloud manager or a user fills a plurality of virtual machines of the virtual machine cluster in a creation template of one virtual machine when it is determined that the virtual machine cluster needs to be created for a distributed application and the virtualization module receives a creation template of a plurality of virtual machines. The creation template of each of the virtual machines may include the number of virtual machines, and identifiers and configuration information thereof.

Preferably, the creation template of the virtual machine received by the virtualization module may be a creation template classified according to the specification of the virtual machine, for example, a to-be-created virtual machine includes two kinds of specifications, and the virtualization module may receive two creation templates of the virtual machine, where each creation template includes the number of virtual machines, and specifications and identifiers thereof.

For example, 15 virtual machines need to be created for a distributed application, and two virtual machines of the 15 virtual machines need to serve as management nodes, and specification information thereof is eight CPUs, 100 G memory, and other virtual machines serve as serving nodes, and specification information thereof is two CPUs, 40 G memory (specifications of the serving nodes may be the same, or may be different, and in this embodiment, this embodiment is described using an example that specifications of the serving nodes are the same). The virtualization module receives the following creation templates of the virtual machine: template one (a first virtual machine creation request): virtual machine specification: 8 CPUs, 100 G memory; a virtual machine identifier: VM 1 and VM 6; and the number of virtual machines: 2; and template two (second virtual machine creation request): virtual machine specification: 2 CPUs, 40 G memory; a virtual machine identifier: VM 2, VM 3, VM 4, VM 5, VM 7, VM 8, VM 9, VM 10, VM 11, VM 12, VM 13, VM 14, and VM 15; and the number of virtual machines: 13.

Step 602: The virtualization module groups the plurality of virtual machines into the plurality of virtual machine groups.

In the foregoing embodiment, when it is determined that a virtual machine cluster needs to be created for a distributed application, a cloud manager or a user or management software of another distributed application groups a plurality of virtual machines of the virtual machine cluster, and then the virtualization module receives a creation request of a grouped plurality of virtual machine groups. However, in this embodiment, the virtualization module receives creation requests of a plurality of virtual machines, and the virtualization module needs to group the plurality of virtual machines, to obtain a plurality of virtual machine groups. The virtualization module needs to consider a distributed attribute of the distributed application when grouping the plurality of virtual machines. For example, management node distribution is created to meet the reliability, that is, virtual machines serving as a management node cannot be grouped in a same group, and an obtained virtual machine group is as follows:

A first virtual machine group: the number of VMs:5; and members: VM 1, VM 2, VM 3, VM 4, and VM 5.

A second virtual machine group: the number of VMs:5; and members: VM 6, VM 7, VM 8, VM 9, and VM 10.

A third virtual machine group: the number of VMs:5; and members: VM 11, VM 12, VM 13, VM 14, and VM 15.

During grouping of the foregoing virtual machine group, the number of virtual machines in each virtual machine group is the same. However, the foregoing is only a specific implementation manner of the present invention. In another embodiment, the number of virtual machines in each virtual machine group may be random.

Step 603: The virtualization module determines one home physical rack for each virtual machine group.

Step 604: Create each virtual machine group on the home physical rack of each virtual machine group.

Step 605: The virtualization module acquires an identifier of each virtual machine group.

Step 606: The virtualization module provides the identifier of each virtual machine group to an application module on an upper layer, so that the application module on the upper layer processes a service according to the identifier of each virtual machine group.

Specific implementation details of steps 603-606 are similar to those of steps 403-406, and are not further described in this embodiment In the embodiment of the present invention, because the virtualization module receives creation requests of a plurality of virtual machines, the virtualization module further groups a plurality of virtual machines providing a service to a distributed application, determines a home physical rack for the virtual machine group obtained by grouping, and creates the virtual machine group, so that the created virtual machine cluster can meet a running requirement of the distributed application.

Figure 7:
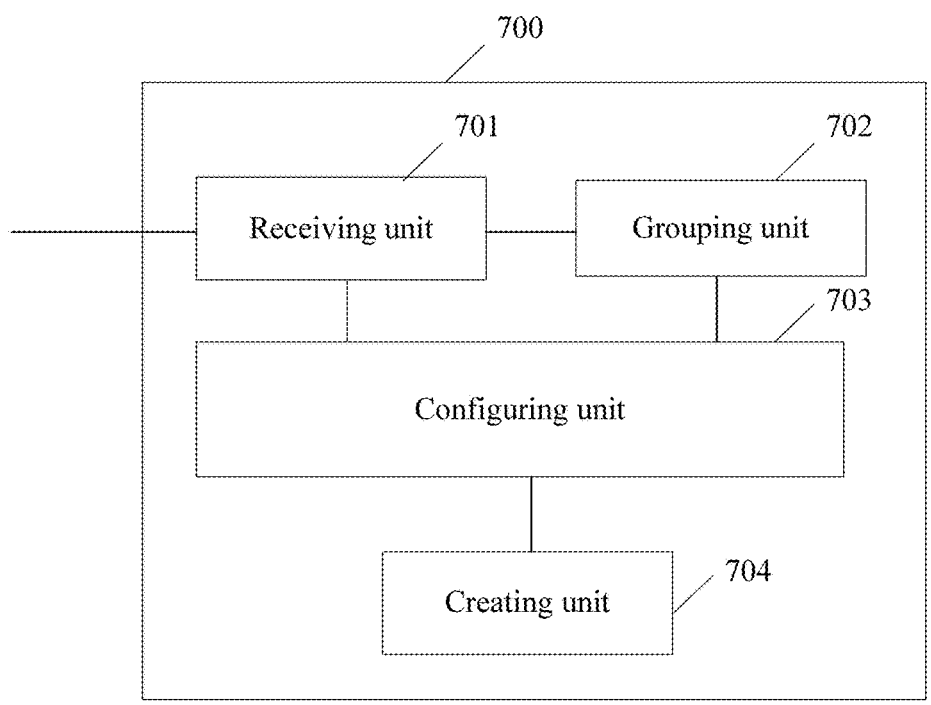
FIG. 7 is a constitutional diagram of an apparatus for creating a virtual machine according to an embodiment of the present invention.

As shown in FIG. 7, an embodiment of the present invention provides an apparatus 700 for creating a virtual machine, which includes a receiving unit 701 configured to receive a virtual machine creation request, where the virtual machine creation request is used to create a plurality of virtual machines; a grouping unit 702 configured to determine a plurality of virtual machine groups, where the plurality of virtual machine groups is obtained by grouping the plurality of virtual machines, and each virtual machine group includes at least one virtual machine; a configuring unit 703 configured to determine a home physical rack for each virtual machine group, where one virtual machine group corresponds to one home physical rack; and a creating unit 704 configured to create each virtual machine group on the home physical rack of each virtual machine group.

Specifically, the creating unit 704 is specifically configured to create, in different physical machines on the home physical rack, different virtual machines in each virtual machine group.

Specifically, in a specific implementation of the embodiment of the present invention, the configuring unit 703 is configured to determine one home physical rack for each virtual machine group according to configuration information of each virtual machine group, where the configuration information of each virtual machine group includes the number of virtual machines included in each virtual machine group and a specifications of each of the virtual machines.

Figure 8:
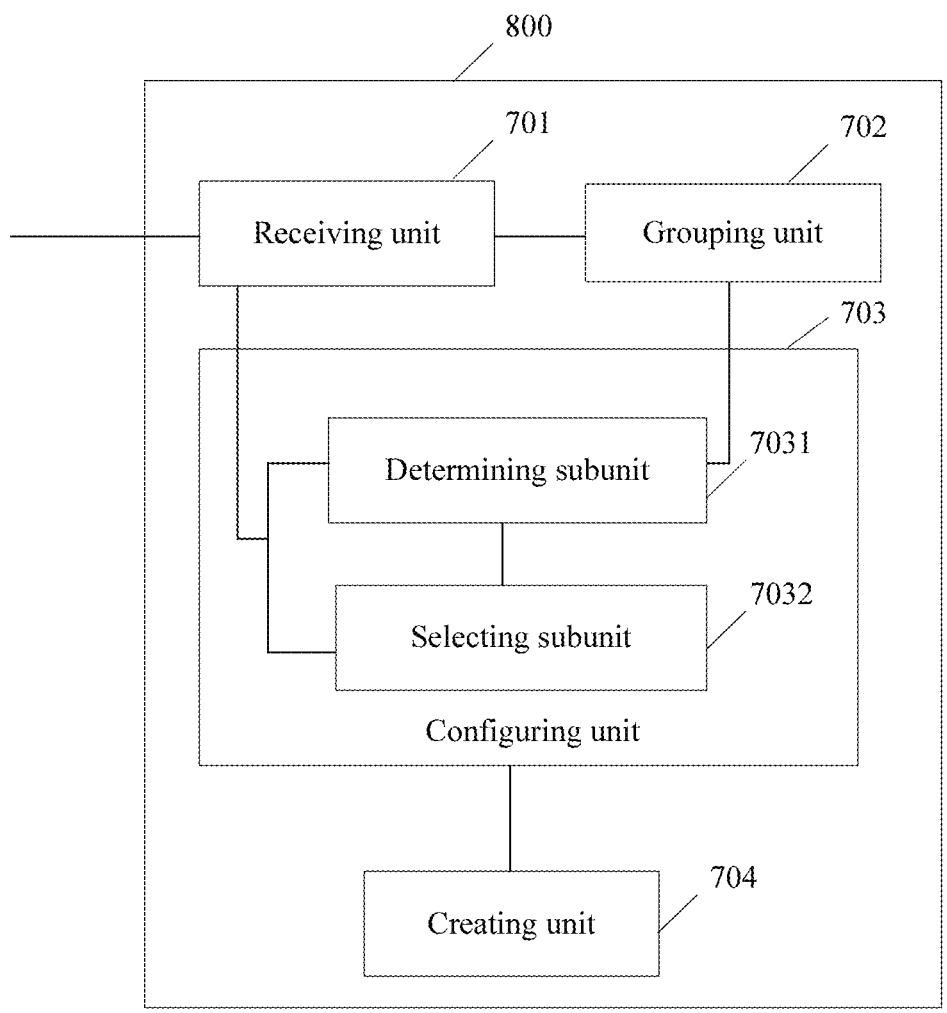
FIG. 8 is a constitutional diagram of another apparatus for creating a virtual machine according to an embodiment of the present invention.

Preferably, as shown in FIG. 8, in another exemplary embodiment of the embodiments of the present invention, in addition to the units shown in FIG. 7, the configuring unit 703 in the apparatus 800 includes a determining subunit 7031 configured to determine a current virtual machine group on a to-be-allocated home physical rack; acquire idle physical racks on a physical device layer; select, from the idle physical racks according to the number of virtual machines included in each virtual machine group and the specification of each of the virtual machines, first physical racks whose idle resources meet a resource required by the current virtual machine group; and a selecting subunit 7032 configured to select one first physical rack from the first physical racks as the home physical rack.

Further, the determining subunit 7031 is specifically configured to determine the number of idle physical machines on each of the idle physical racks; select a second physical rack from the idle physical racks according to the number of virtual machines included in the current virtual machine group, where the number of idle physical machines on the second physical rack is greater than or equal to the number of virtual machines included in the current virtual machine group; and select the first physical rack from the second physical racks according to the specification of each of the virtual machines included in the current virtual machine group, where an idle physical resource of the idle physical machine on the first physical rack satisfies a resource requirement of each of the virtual machines in the current virtual machine group.

Further, the selecting subunit 7032 is specifically configured to acquire constraint information of a virtual machine group, acquire allocation record information of the home physical rack, where the allocation record information includes a correspondence between the virtual machine group of the allocated home physical rack and the home physical rack, and select, according to the allocation record information and the constraint information of the virtual machine group, one first physical rack from the first physical racks as the home physical rack of the current virtual machine group.

In another specific implementation of the embodiment of the present invention, the configuring unit 703 may be specifically configured to acquire constraint information of the virtual machine group, where the constraint information of the virtual machine group denotes an association relationship or a mutex relationship between the plurality of virtual machine groups; and determine one home physical rack for each virtual machine group according to the constraint information of the virtual machine group.

Figure 9:
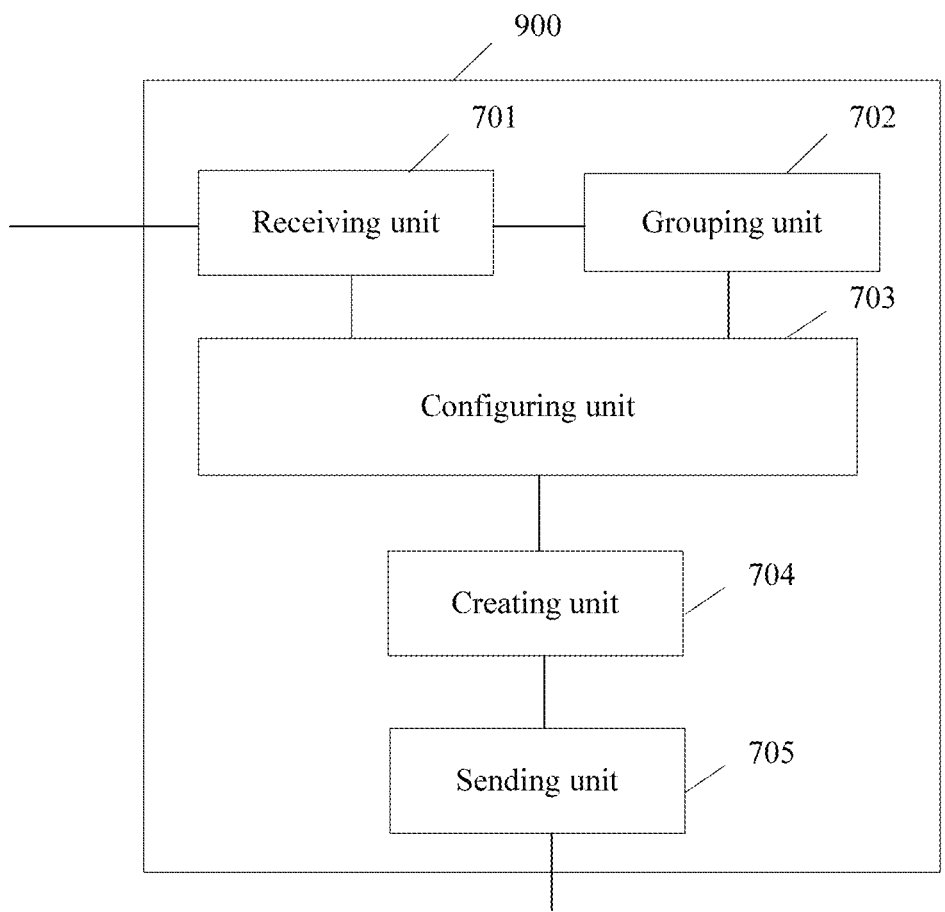
FIG. 9 is a constitutional diagram of still another apparatus for creating a virtual machine according to an embodiment of the present invention.

In another specific implementation of the embodiment of the present invention, as shown in FIG. 9, in addition to the units shown in FIG. 7, an apparatus 900 further includes a sending unit 705 configured to acquire an identifier of each virtual machine group, and provide the identifier of each virtual machine group to an application module on an upper layer, so that the application module on the upper layer processes a service according to the identifier of each virtual machine group.

Preferably, the sending unit 705 is configured to send a rack number of each of the virtual machines to the application module on the upper layer, where the rack number of each of the virtual machines is an identifier of a virtual machine group where each of the virtual machines is located.

Figure 10:
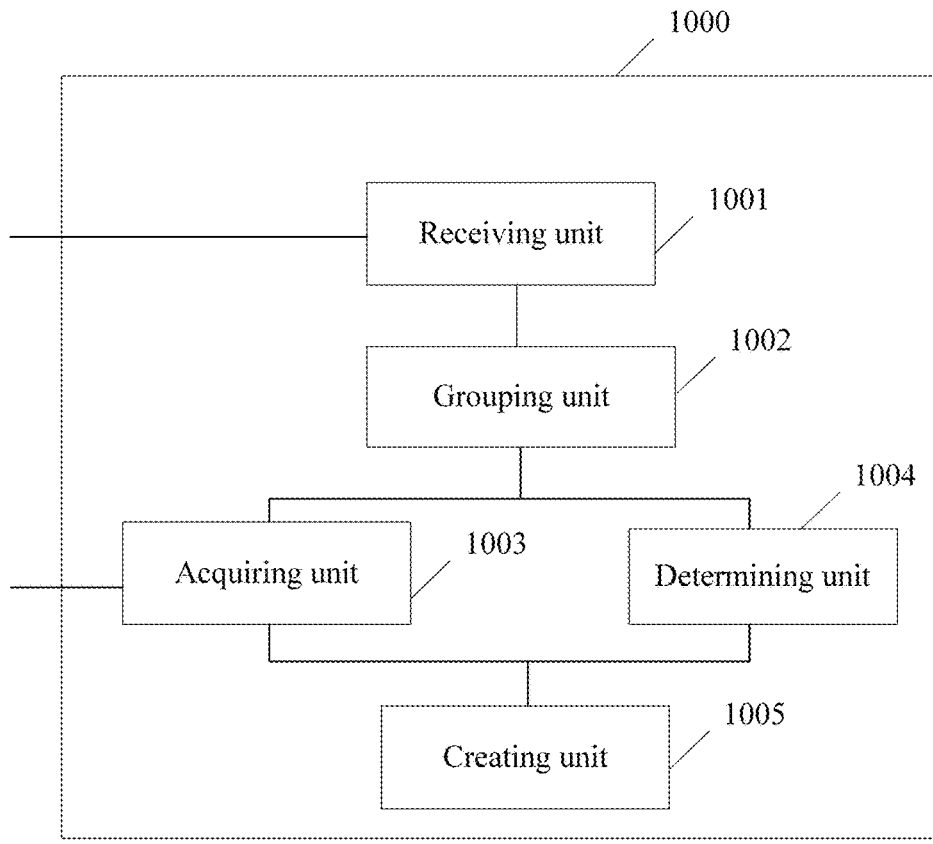
FIG. 10 is a constitutional diagram of yet another apparatus for creating a virtual machine according to an embodiment of the present invention.

As shown in FIG. 10, an embodiment of the present invention provides an apparatus 1000 for creating a virtual machine, which includes a receiving unit 1001 configured to receive a virtual machine creation request, where the virtual machine creation request is used to create a plurality of virtual machines for a distributed application; a grouping unit 1002 configured to determine a plurality of virtual machine groups, where the plurality of virtual machine groups is obtained by grouping the plurality of virtual machines, and each virtual machine group includes at least one virtual machine; an acquiring unit 1003 configured to acquire configuration information of each virtual machine group, where the configuration information of each virtual machine group includes the number of virtual machines included in each virtual machine group and a specification of each of the virtual machines; a determining unit 1004 configured to determine a deployment attribute of the virtual machine group according to a running attribute of the distributed application; and a creating unit 1005 configured to create each virtual machine group according to the configuration information of each virtual machine group and the deployment attribute of the virtual machine group.

Further, the determining unit 1004 is configured to determine a virtual machine rack attribute of the virtual machine group according to a rack awareness attribute of the distributed application, where the virtual machine rack attribute denotes that one virtual machine group corresponds to one home physical rack.

The creating unit 1005 is configured to determine one home physical rack for each virtual machine group according to the virtual machine rack attribute of the virtual machine group, and create each virtual machine group on the home physical rack of each virtual machine group according to the configuration information of each virtual machine group.

Figure 11:
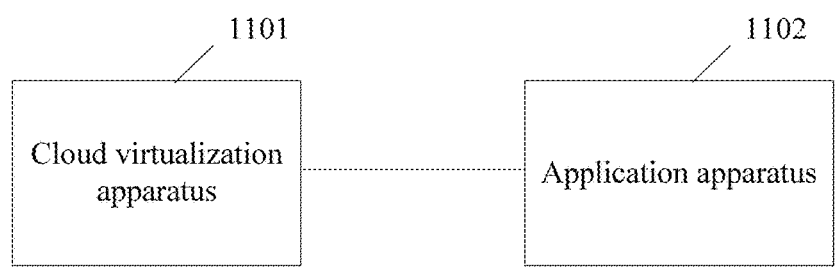
FIG. 11 is a constitutional diagram of a system for creating a virtual machine according to an embodiment of the present invention.

As shown in FIG. 11, an embodiment of the present invention provides a system for creating a virtual machine, which includes a cloud virtualization apparatus 1101 configured to receive a virtual machine creation request, where the virtual machine creation request is used to create a plurality of virtual machines; determine a plurality of virtual machine groups, where the plurality of virtual machine groups is obtained by grouping the plurality of virtual machines, and each virtual machine group includes at least one virtual machine; determine a home physical rack for each virtual machine group, where one virtual machine group corresponds to one home physical rack; create each virtual machine group on the home physical rack of each virtual machine group; acquire an identifier of each virtual machine group, and provide the identifier of each virtual machine group to an application apparatus 1102; and the application apparatus 1102 configured to receive the identifier of each virtual machine group, and process a service according to the identifier of each virtual machine group.

Figure 12:
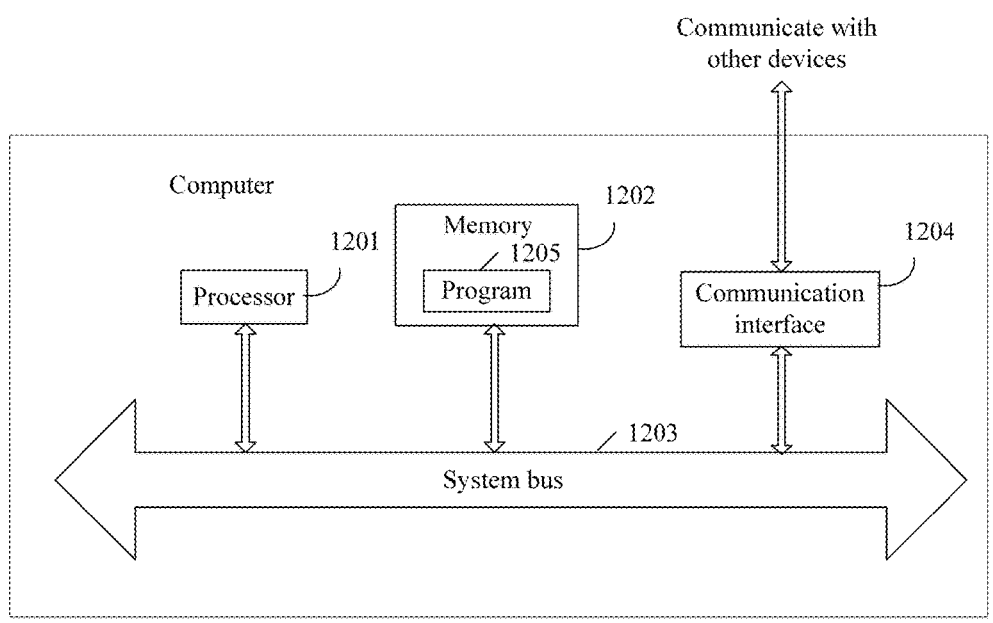
FIG. 12 is a constitutional diagram of a computer according to an embodiment of the present invention.

FIG. 12 is a schematic structural diagram of a computer according to an embodiment of the present invention. The computer according to the embodiment of the present invention may include a processor 1201, a memory 1202, a system bus 1203, and a communications interface 1204. The processor 1201, the memory 1202, and the communications interface 1204 may be connected using the system bus 1203 and communicate with each other.

The processor 1201 may be a single-core or multi-core central processing unit, or a integrated circuit, or be configured as one or more integrated circuits implementing the embodiments of the present invention.

The memory 1202 may be a high speed random access memory (RAM), or a non-volatile memory, for example, at least one disk memory.

The memory 1202 is configured to execute a computer-executable instruction 1205. Further, the computer-executable instruction 1205 may include program code.

When a computer runs, the processor 1201 executes the computer-executable instruction 1205, and therefore performs the method process shown in any one of FIG. 2, FIG. 3, FIG. 4, and FIG. 6.

A person of ordinary skills in the art may onstand that, various aspects, or possible implementation manners of various aspects of the present invention may be implemented as a system, a method or a computer program product. Therefore, each aspect, or a possible implementation manner of each aspect of the present invention may adopt a complete-hardware embodiment, a complete-software embodiment (including a firmware, residence software, and the like), or a form of combining embodiments of software and hardware aspects, which is herein generally referred to as "circuit", "module" or "system". In addition, various aspects and possible implementation manner of various aspects of the present invention may employ a computer program product form, and the computer program product refers to computer-readable program code stored in a computer-readable medium.

The computer-readable medium may be a computer-readable signal medium or a computer-readable storage medium. The computer-readable storage medium includes but is not limited to, an electronic, magnetic, optical, electromagnetic, infrared or semiconductor system, device or apparatus, or a proper combination of any one mentioned in the foregoing, such as a RAM, a read-only memory (ROM), a erasable programmable read only memory (an EPROM or a fast flash memory), an optical fiber, a portable and compact disc read-only memory (CD-ROM).

A processor in the computer reads computer-readable program code stored in a computer-readable medium, so that the processor is capable of performing each step in the flowchart or a functional action regulated in a combination of each step, and an apparatus performing a functional step regulated in each block or a combination of various blocks in the block diagram is created.

The computer-readable program code may be executed on a user computer completely, or part is executed on a user computer and serves as an independent software packet, and part is executed on a user computer and part is in a remote computer, or the code is executed on a computer or a server completely. It should also be noted that, in some alternative implementation solutions, a function shown in each step in the flowchart or each block in the block diagram may not occur according to the sequence shown in the figure. For example, relied on a related function, two steps shown successively or two blocks may be performed simultaneously actually, or these blocks sometimes may be performed in a reverse sequence.

A person of ordinary skill in the art may be aware that, in combination with the examples described in the embodiments disclosed in this specification, units and algorithm steps may be implemented by electronic hardware or a combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for creating virtual machines for a distributed application, comprising:
receiving a virtual machine creation request, wherein the virtual machine creation request instructs an apparatus to create a plurality of virtual machines for the distributed application;
dividing the plurality of virtual machines as instructed by the virtual machine creation request into a plurality of virtual machine groups according to a rack awareness attribute of the distributed application, wherein each virtual machine group comprises at least one virtual machine;
allocating one home physical rack for each virtual machine group according to constraint information of the plurality of virtual machine groups, wherein the constraint information denotes an association relationship or a mutex relationship of the plurality of virtual machine groups; and
creating the virtual machine groups on the allocated home physical racks respectively.

2. The method according to claim 1, wherein different home physical racks are allocated to different virtual machine groups.

3. The method according to claim 1, further comprising acquiring allocation record information of the home physical racks, wherein the allocation record information comprises a correspondence between the virtual machine groups of the allocated home physical racks and the home physical racks; and wherein one home physical rack is allocated for each virtual machine group according to the allocation record information and the constraint information.

4. The method according to claim 1, further comprising obtaining configuration information of each virtual machine group from the virtual machine creation request, wherein the configuration information comprises a number of virtual machines in the virtual machine group and a specification of each of the virtual machines in the virtual machine group, and wherein different virtual machines of each virtual machine group are created in different physical machines of the allocated home physical rack according to the configuration information of the virtual machine group.

5. The method according to claim 1, further comprising providing an identifier of the virtual machine group to the distributed application for processing a service of a virtual machine belonging to the virtual machine group.

6. The method according to claim 5, wherein the identifier identifies the home physical rack that is allocated to the virtual machine group.

7. An apparatus, comprising:
a memory for storing program routines; and
a processor, coupled to the memory and configured to execute the program routines, wherein the processor is configured to execute the program routines to:
receive a virtual machine creation request, wherein the virtual machine creation request instructs the apparatus to create a plurality of virtual machines for a distributed application;
divide the plurality of virtual machines as instructed by the virtual machine creation request into a plurality of virtual machine groups according to a rack awareness attribute of the distributed application, wherein each virtual machine group comprises at least one virtual machine;
allocate one home physical rack for each virtual machine group according to constraint information of the plurality of virtual machine groups, wherein the constraint information denotes an association relationship or a mutex relationship of the plurality of virtual machine groups; and
create the virtual machine groups on the allocated home physical racks respectively.

8. The apparatus according to claim 7, wherein different home physical racks are allocated to different virtual machine groups.

9. The apparatus according to claim 7, wherein the processor is further configured to execute the program routines to acquire allocation record information of the home physical racks, wherein the allocation record information comprises a correspondence between the virtual machine groups of the allocated home physical racks and the home physical racks, and wherein one home physical rack is allocated for each virtual machine group according to the allocation record information and the constraint information.

10. The apparatus according to claim 7, wherein the processor is further configured to obtain configuration information of each virtual machine group from the virtual machine creation request, wherein the configuration information comprises a number of virtual machines in the virtual machine group and a specification of each of the virtual machines in the virtual machine group, and wherein different virtual machines of each virtual machine group are created in different physical machines of the allocated home physical rack according to the configuration information of the virtual machine group.

11. The apparatus according to claim 7, wherein the processor is further configured to provide an identifier of the virtual machine group to the distributed application for processing a service of a virtual machine belonging to the virtual machine group.

12. The apparatus according to claim 11, wherein the identifier identifies the home physical rack that is allocated to the virtual machine group.

13. A computer program product, comprising non-transitory computer readable medium storing program codes thereon for execution by a computing device, wherein the program codes comprise:
instructions for receiving a virtual machine creation request, wherein the virtual machine creation request instructs an apparatus to create a plurality of virtual machines for the distributed application;
instructions for dividing the plurality of virtual machines as instructed by the virtual machine creation request into a plurality of virtual machine groups according to a rack awareness attribute of the distributed application, wherein each virtual machine group comprises at least one virtual machine;
instructions for allocating one home physical rack for each virtual machine group according to constraint information of the plurality of virtual machine groups, wherein the constraint information denotes an association relationship or a mutex relationship of the plurality of virtual machine groups; and
instructions for creating the virtual machine groups on the allocated home physical racks respectively.

14. The computer program product according to claim 13, wherein different home physical racks are allocated to different virtual machine groups.

15. The computer program product according to claim 13, wherein the program codes further comprise instructions for acquiring allocation record information of the home physical racks, wherein the allocation record information comprises a correspondence between the virtual machine groups of the allocated home physical racks and the home physical racks, and wherein one home physical rack is allocated for each virtual machine group according to the allocation record information and the constraint information.

16. The computer program product according to claim 13, wherein the program codes further comprise instructions for obtaining configuration information of each virtual machine group from the virtual machine creation request, wherein the configuration information comprises a number of virtual machines in the virtual machine group and a specification of each of the virtual machines in the virtual machine group, and wherein different virtual machines of each virtual machine group are created in different physical machines of the allocated home physical rack according to the configuration information of the virtual machine group.

17. The computer program product according to claim 13, wherein the program codes further comprise instructions for providing an identifier of the virtual machine group to the distributed application for processing a service of a virtual machine belonging to the virtual machine group.

18. The computer program product according to claim 17, wherein the identifier identifies the home physical rack that is allocated to the virtual machine group.

* * * * *